(12) United States Patent
Schmidt et al.

(10) Patent No.: US 6,874,543 B2
(45) Date of Patent: Apr. 5, 2005

(54) WOVEN PREFORM FOR STRUCTURAL JOINTS

(75) Inventors: Ronald P. Schmidt, Fort Worth, TX (US); David A. Kalser, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 198 days.

(21) Appl. No.: 10/238,315

(22) Filed: Sep. 10, 2002

(65) Prior Publication Data

US 2003/0056847 A1 Mar. 27, 2003

Related U.S. Application Data

(60) Provisional application No. 60/322,205, filed on Sep. 12, 2001.

(51) Int. Cl.[7] .............................................. D03D 41/00
(52) U.S. Cl. .............................. 139/383 R; 139/383 R; 139/DIG. 1; 442/205
(58) Field of Search .......................... 139/383 R, 384 R, 139/409, 11, DIG. 1; 442/205, 203

(56) References Cited

U.S. PATENT DOCUMENTS

| | | | |
|---|---|---|---|
| 4,063,684 A | 12/1977 | O'Brian et al. | |
| 4,376,710 A | 3/1983 | Gardos et al. | |
| 4,379,798 A | * 4/1983 | Palmer et al. | ............... 428/113 |
| 4,669,523 A | 6/1987 | Sabatie et al. | |
| 4,671,470 A | 6/1987 | Jonas | |
| 4,717,302 A | 1/1988 | Adams et al. | |
| 4,778,637 A | 10/1988 | Adams et al. | |
| 4,782,864 A | 11/1988 | Abildskov | |
| 4,786,548 A | 11/1988 | Place, Jr. | |
| 4,902,326 A | 2/1990 | Jarmon | |

(Continued)

OTHER PUBLICATIONS

Owens et al.; *Tension Pull–off and Shear Test Methods to Characterize 3–D Textile Reinforced Bonded Composite Tee–Joints*0 ; published 2000; Composite Structures, Theory and Practice, Editors: Peter Grant and Carl Q. Roosseau.

Sheahan et al.; *Primary Sandwich Structure, A Unitized Approach*; copyright 2000 by Lockheed Martin; published by the American Institute of Aeronautics and Astronauts, Inc.; pp. 1–8.

Sheahan et al.; *Robust Composite Sandwich Structures*; copyright 1998 by Lockheed Martin; published by the American Institute of Aeronautics and Astronauts, Inc.; pp. 1–12.

Bersuch et al.; *Affordable Composite Structure for Next Generation Fighters*; copyright 1998 by Lockheed Martin, published by Society for the Advancement of Material and Process Engineering; pp. 1–11.

(Continued)

*Primary Examiner*—John J. Calvert
*Assistant Examiner*—Robert H. Muromoto, Jr.
(74) *Attorney, Agent, or Firm*—Bracewell & Patterson, L.L.P.

(57) ABSTRACT

A preform for structural joints has a three-dimensional weave architecture with fill fibers woven to provide layer-to-layer interlocking of layers of warp fiber as well as interlocking of fibers within each layer. At least two legs extend from a base, the base and legs each having at least two layers of warp fibers. The legs are connected at a symmetrical, distributed-column intersection, with an odd number of columns of warp fibers being located being the legs. The outer ends of the base and legs preferably have tapers formed from terminating layers of warp fibers in a stepped pattern. Tracer fibers that include a colored strand and an x-ray opaque strand are woven into the preform at selected locations as a warp fiber. The tracer fibers allow for identification of a selected location or a selected portion of the preform through visual inspection or by x-ray image.

18 Claims, 4 Drawing Sheets

U.S. PATENT DOCUMENTS

| | | | |
|---|---|---|---|
| 4,922,968 A | | 5/1990 | Bottger et al. |
| 5,026,595 A | | 6/1991 | Crawford, Jr. et al. |
| 5,042,565 A | | 8/1991 | Yuen et al. |
| 5,085,252 A | * | 2/1992 | Mohamed et al. ............ 139/22 |
| 5,108,830 A | | 4/1992 | Osaka et al. |
| 5,137,058 A | * | 8/1992 | Anahara et al. ......... 139/384 R |
| 5,184,706 A | | 2/1993 | Christensen |
| 5,236,020 A | * | 8/1993 | Sakatani et al. ......... 139/384 R |
| 5,263,516 A | | 11/1993 | van Schuylenburch |
| 5,270,094 A | * | 12/1993 | Anahara et al. ............ 428/113 |
| 5,334,414 A | | 8/1994 | Edie et al. |
| 5,343,897 A | * | 9/1994 | Sakatani et al. ......... 139/384 R |
| 5,348,056 A | * | 9/1994 | Tsuzuki .................. 139/384 R |
| 5,397,595 A | | 3/1995 | Carroll et al. |
| 5,399,418 A | * | 3/1995 | Hartmanns et al. ......... 428/218 |
| 5,451,448 A | | 9/1995 | Sawko et al. |
| 5,465,760 A | * | 11/1995 | Mohamed et al. ............ 139/11 |
| 5,487,941 A | | 1/1996 | Pepin |
| 5,540,260 A | * | 7/1996 | Mood .......................... 139/11 |
| 5,540,877 A | | 7/1996 | Repetto et al. |
| 5,616,175 A | | 4/1997 | Walsh |
| 5,651,474 A | | 7/1997 | Callaghan et al. |
| 5,657,795 A | | 8/1997 | Sawko et al. |
| 5,720,339 A | | 2/1998 | Glass et al. |
| 5,759,620 A | | 6/1998 | Wilson et al. |
| 5,767,023 A | * | 6/1998 | Berger et al. ............... 442/205 |
| 5,783,279 A | | 7/1998 | Edgson et al. |
| 5,785,094 A | | 7/1998 | Yoshida |
| 5,804,277 A | * | 9/1998 | Ashbee ....................... 428/112 |
| 5,833,802 A | * | 11/1998 | Yasui et al. ................. 156/510 |
| 5,840,221 A | | 11/1998 | Lau et al. |
| 5,952,075 A | | 9/1999 | Clarke et al. |
| 5,962,135 A | | 10/1999 | Walker et al. |
| 5,981,022 A | | 11/1999 | Min et al. |
| 6,003,563 A | * | 12/1999 | Uchida et al. ................. 139/11 |
| 6,010,652 A | | 1/2000 | Yoshida |
| 6,013,226 A | | 1/2000 | Steel et al. |
| 6,019,138 A | | 2/2000 | Malck et al. |
| 6,124,015 A | | 9/2000 | Baker et al. |
| 6,129,122 A | | 10/2000 | Bilisik |
| 6,207,598 B1 | * | 3/2001 | Lee et al. ................... 442/206 |
| 6,228,453 B1 | | 5/2001 | Fareed et al. |
| 6,338,367 B1 | * | 1/2002 | Khokar ........................ 139/11 |
| 6,470,916 B1 | * | 10/2002 | Uchida et al. ................ 139/11 |
| 6,555,488 B1 | * | 4/2003 | Qiu et al. ................... 442/205 |
| 6,712,099 B2 | * | 3/2004 | Schmidt et al. ......... 139/383 R |
| 6,742,547 B2 | * | 6/2004 | Bryn et al. ............. 139/383 R |

OTHER PUBLICATIONS

Wanthal et al.; *Interlaminar Reinforced Composites Development for Improved Damage Tolerance*; copyright 2000 by the Boeing Company, Lockheed Martin; Northrop Grunman; Society for the Advancement of Material and Process Engineering; 15 pages.

Bersuch et al.; *3–D Composites in Primary Aircraft Structure Joints*; published Jan. 1997 AGARD Bolted/onded Joints in Polymeric Composites; pp. 16–1—16–10.

Sheahan et al; *Affordable 3–D Intergrated Composite Structures*; copyright 2000 by Lockheed Martin; published by the Universal Technology Corporation; 20 pages.

Steven Clark; *A Comparison of Braiding, Knitting and Weaving Technologies, Engineered Textile Preforms for RTM*; Oct. 28–Nov. 1, 1997, pp. 15–23.

Wilson et al.; <<SPARC>>*5 Axis, 3–D Woven, Low Crimp Preforms*; Bombardier Aerospace, Short Brothers pplc, May 31–Jun. 4, 1998, pp. 102–113.

Hans Walter Kipp; *Narrow Fabric Weaving*; 1989, pp. 221–227.

Citations from Engineering Index; EIX (including abstracts).

Sketches of BRM Products.

* cited by examiner

WOVEN PREFORM FOR STRUCTURAL JOINTS

CROSS-REFERENCE TO RELATED APPLICATION

Benefit is herein claimed of the filing date under 35 USC § 119 and/or § 120 and CFR 1.78 to U.S. Provisional Patent Application Ser. No. 60/322,205, filed on Sep. 12, 2001, entitled "Preform Weave Patterns."

BACKGROUND OF THE INVENTION

1. Field of the Invention

This invention generally relates to woven preforms and particularly relates to woven preforms used in bonding of components at structural joints.

2. Description of the Related Art

When joining components in a structural joint, layers of fabric infused with a polymer resin can be used to join the components. For example, two components are brought to the desired positions and orientation, and layers of composites are adhered to the outer surfaces of the components: one portion of the fabric adhering to one component, another portion adhering to the other component. Multiple layers of fabric are stacked to increase the strength of the joint and to form a desired radius of curvature at the intersection.

While this method works, the joint can be improved by having fibers that extend through the intersection of the components, connecting the composite layers on both sides of the joint. A three-dimensional (3-D), woven, textile preform provides for fibers that extend through the intersection of a joint. The preform is infused with a resin that is cured to form a rigid polymer matrix surrounding the fibers of the preform.

Weave patterns for woven composite textiles have been used in the past which can provide for various shapes of three-dimensional preforms. However, these weave patterns were typically single-layer connectors, for example, U.S. Pat. No. 4,671,470 to Jonas, in which is disclosed an H-shaped connector for connecting a wing spar to a sandwich skin structure. Also, three-dimensional preforms have been woven to fill gaps formed during layup of composite layers into tight radius intersections. A gap-filling preform is disclosed in U.S. Pat. No. 5,026,595 to Crawford, Jr., et al.

However, these prior-art preforms have been limited in their ability to withstand high out-of-plane loads, to be woven in an automated loom process, and to provide for varying thickness of portions of the preform. Weave construction and automation of preform weaving was in its infancy and provided only a small advantage over conventional laminated, fiber-wound, or braided composites, limiting the versatility of the preforms.

There is a need for an improved preform having a modified weave architecture, providing the preform with symmetrical load-carrying ability and symmetrical load distribution. In addition, there is a need for an improved preform having a modified taper and weave sequence for forming the taper. Also, there is a need for a preform having tracer fibers for identifying selected portions of the preform or selected locations of the preform.

SUMMARY OF THE INVENTION

A preform for structural joints has a three-dimensional weave architecture with fill fibers woven to provide layer-to-layer interlocking of layers of warp fiber as well as interlocking of fibers within each layer. The woven preform transfers out-of-plane loading through directed fibers to minimize inter-laminar tension. The preform has a base and at least two legs extending from the base, the base and legs each having at least two layers of warp fibers.

The fill fibers follow a weave sequence that carries them through a portion of the base, then into the legs, then through the opposite portion of the base, and back through the entire base to return to the starting point of the fill tow. The legs are connected at a symmetrical, distributed-column intersection, with an odd number of columns of warp fibers being located between the legs. This allows for symmetry about a central plane in the weave pattern, providing symmetrical load-carrying ability. The outer ends of the base and legs preferably have tapers formed from terminating layers of warp fibers in a stepped pattern.

Tracer fibers, comprising a colored strand and an x-ray opaque strand, are located in the preform at selected locations as a warp fiber. The colored strand preferably has a color that contrasts with the surrounding fill and warp fibers, allowing the user to visually determine a selected location on the preform or to identify a portion of the preform. The x-ray opaque strand allows a user to determine the location using an x-ray image of the preform. For example, the tracer fibers may be located at the beginning of the tapers, identifying where the thickness of the leg or base begins to decrease for accurate dimensional inspection of the preform. Also, tracer fibers having different colors may be used on different sections of the preform, allowing the user to distinguish the legs and the base for ensuring proper orientation of the preform in the composite structure.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
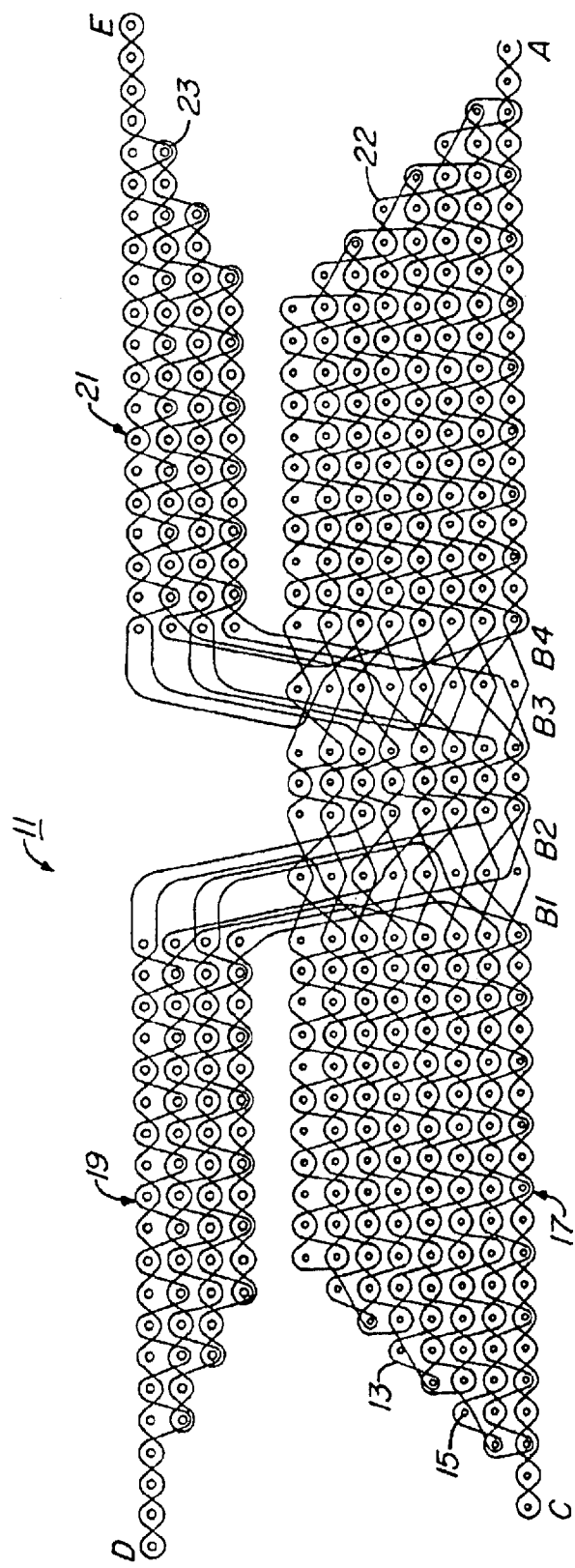
FIG. 1 is a schematic end view of a pi-shaped preform woven using a fill-tow weave pattern in accordance with the invention.
Figure 2:
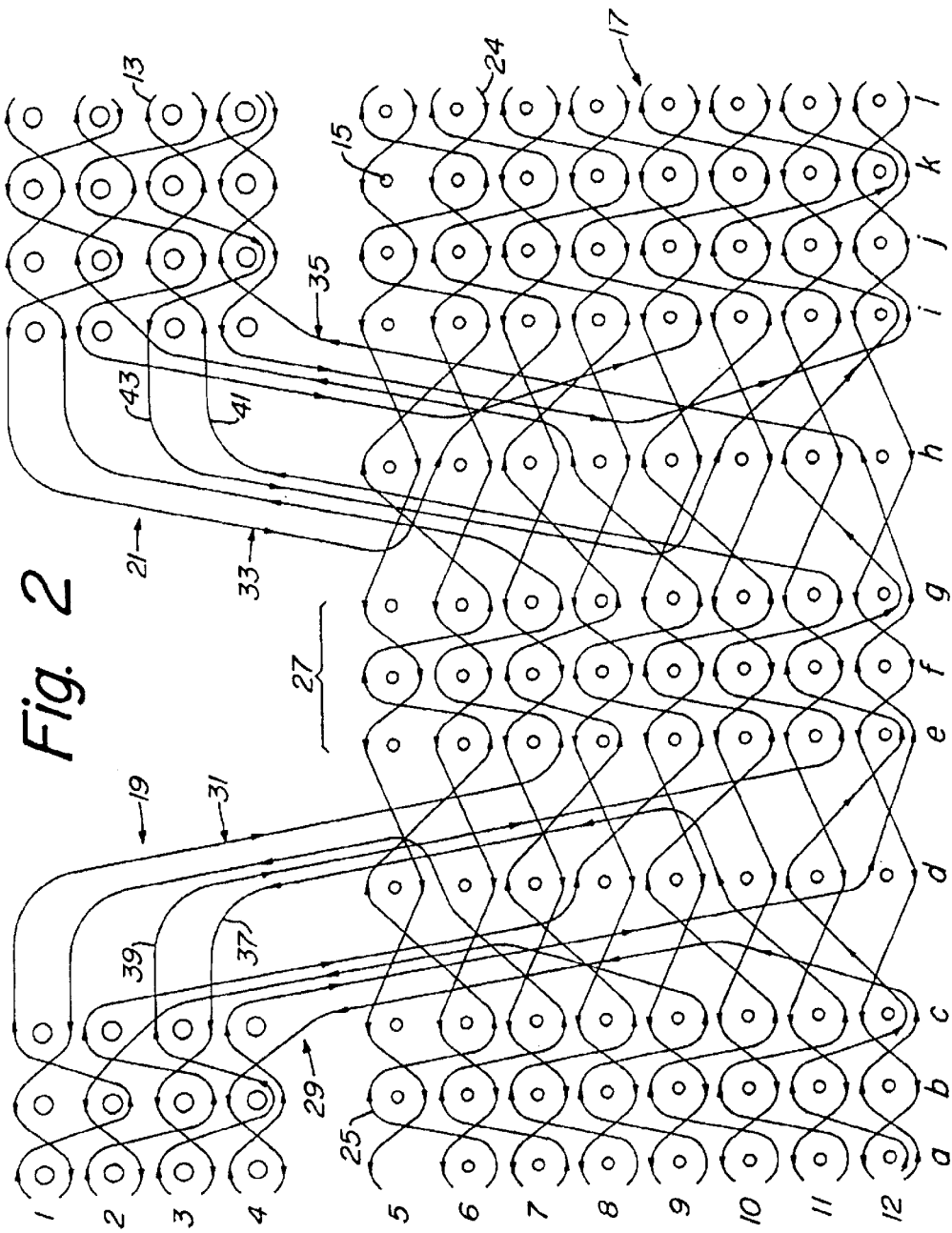
FIG. 2 is an enlarged schematic end view of the central portion of the preform of FIG. 1.
Figure 3:
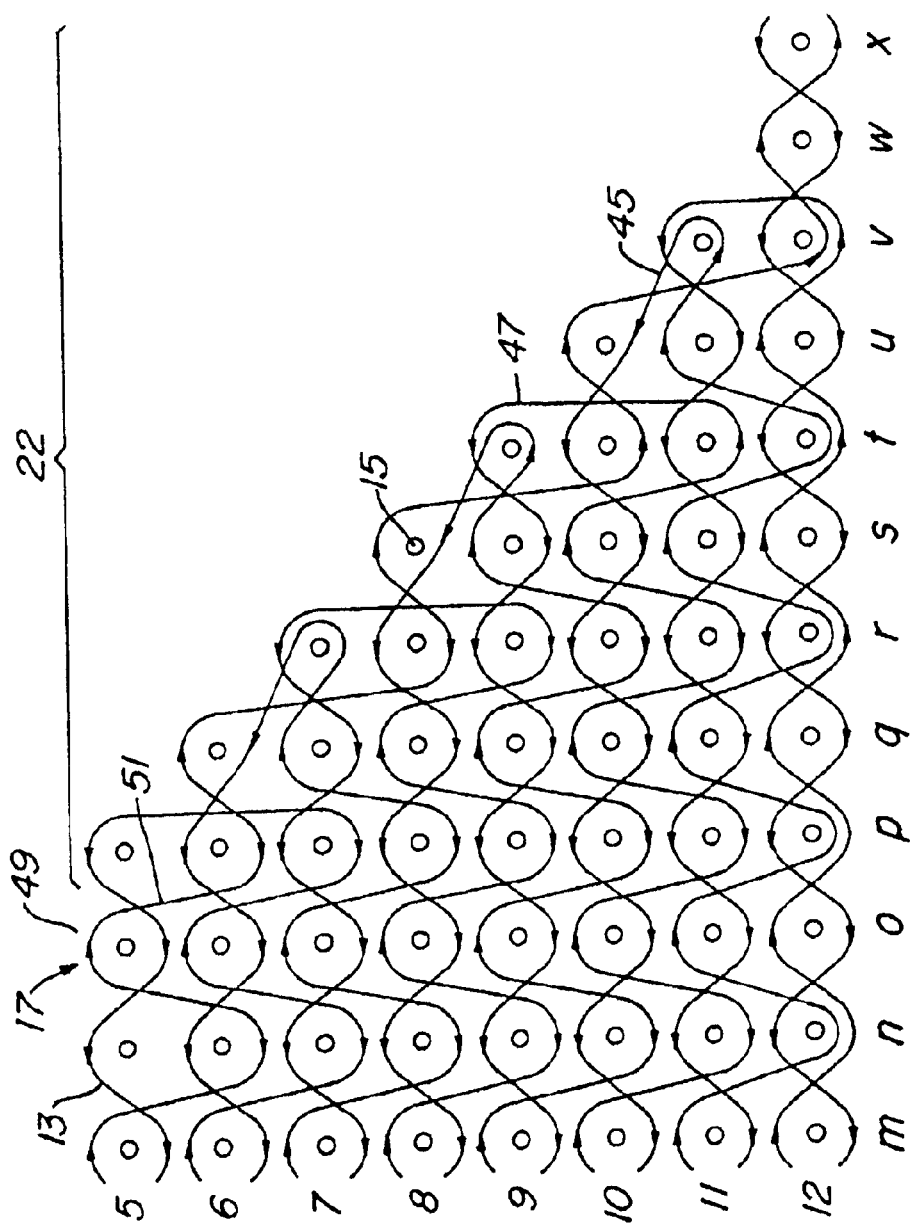
FIG. 3 is an enlarged schematic end view of the right lateral edge of the base of the preform of FIG. 1.

FIGS. 1 through 4 illustrate a preferred embodiment of a three-dimensional preform 11. Preform 11 is formed by weaving one or more fill fibers 13 in a tow pattern through a plurality of warp fibers 15, warp fibers 15 extending perpendicularly to the plane of the tow pattern. In FIGS. 1 through 3, fill fibers 13 are shown in the viewing plane, whereas warp fibers 15 are shown as perpendicular to the viewing plane. FIG. 1 illustrates the complete tow pattern used to form pi-shaped preform 11, whereas FIGS. 2 and 3 illustrate portions of the pattern of FIG. 1. Fibers 13, 15 are shown as spaced apart in the schematic views of the architecture, though fibers 13, 15 are compacted together when actually woven into a completed preform 11.

All warp fibers 15 in preform 11 are generally parallel to each other, with slight undulations along the longitudinal length of each fiber 15, and are arranged in generally vertical columns. Preform 11 is preferably woven from materials used for typical composite structures, for example, fiberglass and carbon fibers, and is woven to have a base 17 and at least two legs 19, 21 extending from base 17, forming a pi-shaped profile. Base 17 and legs 19, 21 each comprise at least two layers of warp fibers 15 and are shown as having optional tapered edges. For ease of weaving, preform 11 is woven with legs 19, 21 laid over against base 17, though legs 19, 21 are intended for use in an upright position, forming a clevis. Base 17 is shown having eight layers of warp fibers 15, and legs 19, 21 are shown having four layers of warp fibers 15.

Optionally, as shown, warp fibers 15 in base 17 have a smaller cross-sectional area than warp fibers 15 in legs 19, 21. This allows the use of a greater number of warp fibers 15 in weaving base 17 to have approximately the same overall size as for base 17 having a fewer number of larger warp fibers 15. The additional columns provide for doubled interlocking between layers of warp fibers 15 in base 17 and provide for a greater resolution on the optional tapered edges of base 17, creating smoother tapers. By using smaller warp fibers 15 only in base 17 and not in legs 19, 21, the increase in time required to weave the architecture on a weaving loom is minimized while still providing a stronger base 17 in preform 11 through a greater amount of interlocking of warp fibers 15.

Referring to FIG. 1, preform 11 is illustrated with the weave pattern beginning and ending at position A, which is shown at the right of base 17. In a typical portion of the weave sequence, fill fiber 13 alternates over and under warp fibers 15 of one layer during each leftward pass, interlocking fibers 15 of that layer. Also, in a typical portion of the weave sequence, fill fiber 13 alternates over and under warp fibers 15 of two adjacent layers during each rightward pass, interlocking the layers to each other. As shown in the figures and described below, portions of the weave sequence, including those within leg 21, at edges, and at outer surfaces of preform 11, differ from these general statements.

The general weave sequence begins with fill fiber 13 at position A and extending toward position C at the left of base 17. From position C, fill fiber 13 extends toward the center of base 17 to either position B1 or B2, from which fill fiber 13 extends upward out of base 17 and into leg 19 to position D at the left end (or upper end during use) of leg 19. Fill fiber 13 then extends back into base 17 at position B1 or B2, passes through central columns of warp fibers 15 located between legs 19, 21, then out of position B3 or B4 and into leg 21 to position E. Fill fiber 13 extends from position E back into base 17 at position B3 or B4 and returns to position A. To complete the sequence, another pass is made from position A to position C then back to position A, without fill fiber 13 entering legs 19, 21. Terminating layers of warp fibers 15 in a stepped pattern forms tapered edges on base 17 and legs 19, 21, such as taper 22 on the right lateral edge of base 17 and taper 23 on leg 21.

To complete one unit cell, or vertical section, the passes of fill fiber 13 across preform 11 are repeated for adjacent layers of warp fibers 15 until all layers are interlocked. The complete architecture shown in FIG. 1 from the beginning of the fill-tow path to the end produces a vertical section that measures approximately 0.2 inches along the longitudinal length, which is parallel to warp fibers 15. The fill-tow pattern is repeated to form adjacent vertical sections, creating continuous lengths of preform. Details of sections of the weave sequence are illustrated in FIGS. 2 and 3 and are further described below.

FIG. 2 is an enlarged view of the central section of preform 11, comprising the matrix of columns a through l and layers 1 through 12, and the weave pattern will be described using the matrix. For example, the top, left-hand warp fiber 15 in base 17 is designated a5, whereas the lower, right-hand warp fiber 15 is l12.

FIG. 2 shows the weave pattern used for forming legs 19, 21 and base 17 in pi-shaped preform 11. Base 17 is shown with eight layers of warp fibers 15, and legs 19, 21 are shown with four layers of warp fibers 15, though the pattern can be modified to work with more or fewer layers of warp fibers. The weave pattern provides for interlocking of warp fibers 15 within a layer, such as with fiber portion 24 in layer 6, and interlocking between layers of warp fibers, such as with fiber portion 25 in layers 5 and 6. Adjacent layers are interlocked by running a portion of fill fibers 13 over a warp fiber 15 in a first layer in a first column and below a warp fiber in an adjacent, second layer in an adjacent, second column, the second layer being below the first layer. Legs 19, 21 are woven in a laid-over, horizontal position, as shown, while the pattern is woven. During installation, each leg 19, 21 is moved to a vertical, standing position, the width of each leg 19, 21 when standing upright comprising layers 1, 2, 3, and 4.

Preform 11 is improved from previous woven preforms in providing a highly symmetrical, distributed intersection of legs 19, 21 with base 17. Arrows are used to indicate the direction a particular portion of the fill fibers 13 is traveling in the description of the figure, though the weave can also be done in the reverse order or in an altered sequence of passes between left and right edges of base 17. Base 17 has three central columns 27 of warp fibers, comprising columns e, f, and g, and two separator columns of warp fibers, columns d and h, which are the adjacent columns to either lateral side of central columns 27. The use of an odd number of central columns 27 allows weave to form an approximately mirror image to either lateral side of a central plane of symmetry bisecting column f, improving the symmetry of load distribution within base 17. While shown as having three central columns 27, the preferred embodiment of preform 11 may have any odd number of central columns 27, the number of central columns determining the nominal width of the clevis formed when legs 19, 21 are in an upstanding position.

To symmetrically introduce loads from legs 19, 21 into base 17, such as loads from a member (not shown) bonded between upstanding legs 19, 21, the portions of fill fibers 13 connecting legs 19, 21 are divided into groups 29, 31, 33, 35 of equal or substantially equal numbers of fiber portions. Each group 29, 31, 33, 35 intersects base 17 between one of separator column d, h and central columns 27 or between one of separator column d, h and the remaining right or left lateral columns adjacent that separator column d, h. For example, group 29 extends between layers 2 and 4 of leg 19 and base 17, intersecting base 17 between columns c and d. Likewise, group 31 intersects base 17 between columns d and e, group 33 intersects base 17 between columns g and h, and group 35 intersects base 17 between columns h and i.

Though shown in the preferred location at approximately the center of preform 11, central columns 27 may comprise columns of warp fibers 15 located laterally from the center of preform 11. For example, columns b, c, and d may comprise the central columns, and columns a and e may act as the separator columns. This offsets legs 19, 21 toward an outer edge of base 17, though still providing symmetry in the weave of base 17 about columns b, c, and d and providing the symmetrical distribution of the load from legs 19, 21 into base 17.

As shown by the arrowheads in the figure, the weave sequence produces within each group 29, 31, 33, 35 two fiber portions that exit base 17 and two fiber portions that enter base 17. The fiber portions within each group extend from alternating layers 1, 2, 3, 4 of legs 19, 21 and are distributed into the weave of base 17 among layers 5, 6, 7, 8, 9, 10, 11, 12, further enhancing symmetrical load distribution. For example, the fiber portions of group 31 intersect base 17 between columns d and e, the fiber portions extending to and from layers 1 and 3 of leg 19. To illustrate the incorporation into base 17 of portions within groups 29, 31, 33, 35, the weave path of portions 37, 39 of group 31 and portions 41, 43 of group 33 are described below.

The weave pattern of preform 11 in layer 12 of base 17 continues upward until all layers have been woven together, the pattern then restarting at the edge of base 17, as described above. Fill fiber 13 passes rightward interlocking layers 10 and 12 at columns a, b, and c, then emerges as portion 37 under warp fiber c11 and passes between fibers d9 and d10. Portion 37 extends upward and out of base 17 between columns d and e, then into layer 3 of leg 19 for a leftward pass interlocking warp fibers 15 of layer 3 only. Fill fiber 13 wraps around the left-most warp fiber 15 of layer 3 (as shown in FIG. 1), then returns rightward, interlocking layers 3 and 4 of leg 19. Fill fiber 13 emerges from leg 19 as portion 39, passing over warp fiber c3 and turns downward into base 17 between columns d and e. Portion 39 passes under warp fiber e11, continuing the interlocking of layers 10 and 11 within central columns 27 (e, f, and g), emerging as portion 41 between column g and h. Portion 41 extends upward out of base 17 into leg 21, interlocking warp fibers 15 of layer 3 only. As portion 41 reaches the right lateral edge of leg 21, it returns as portion 43, which interlocks layers 3 and 4 of leg 21, then reenters base 17 between columns g and h. Portion 43 crosses column h between warp fibers h9 and h10, then begins the interlocking of the right lateral warp fibers in layers 10 and 11 of base 17, extending to the right lateral edge before reversing to make the subsequent leftward pass. The alternating distribution of portions of fibers from layers 1, 2, 3, and 4 into groups 29, 31, 3, 35, as well as the staggered locations where fiber portions cross separator columns d, h provide improved load distribution throughout the layers of base 17.

FIG. 3 is an enlarged view of the weave pattern used to form taper 22 on the right lateral edge of base 17. Tapers, such as tapers 22 and taper 23 (FIG. 1) are formed on an outer edge of a preform by terminating successive layers of warp fibers at lengths that are shorter than prior layers. For example, FIG. 2 shows layer 11 terminating at column v, whereas layer 10 terminates at column u, layer 10 being one warp fiber 15 shorter than layer 11. Likewise, layer 9 is shorter than layer 10, and this pattern repeats for each adjacent upper layer. A preform having a tapered edge has a better resistance to peel loads than a preform in which the warp-fiber layers all terminate at the same length. In addition, use of a smaller tow size for the warp taper tows provides a smoother, more gradual transition from the preform to the composite laminate to which it is joined. The weave pattern in FIG. 3 is for the eight layers of warp fibers 15 of base 17. The same interlocking sequence as shown in FIG. 2 and described above is continued outward to columns m through x.

During the main portion of the weave sequence, each rightward pass of fill fiber 13 interlocks adjacent layers of warp fibers 15 and terminates at taper 22, looping to return through base 17 in a leftward pass in the adjacent upper layer. As fill fiber 13 terminates the rightward pass, an improved weave pattern directs the end portions in an end sequence alternating between layers. For example, fiber portion 45 is the end portion of the rightward pass interlocking layers 11 and 12, and portion 45 wraps over warp fiber u11 and under warp fiber v11. Fiber portion 45 then loops upward to layer 10, passing under u10 and over t10, beginning the leftward pass that interlocks warp fibers 15 of layer 10 only. This end sequence also occurs at layers 7 and 9.

On layers 6, 8, and 10, the end sequence occurs with the rightward pass stopping short of the ends of the layers. For example, as fill fiber 13 passes rightward while interlocking layers 10 and 11, which terminate at columns u and v, respectively, fiber portion 47 passes under fiber t11 and extends upward between columns t and u. Portion 47 wraps over fiber t9, then begins a leftward pass, interlocking the fibers of layer 9 only. These sequences leave fibers q6, s8, and u10 on the outside of the adjacent portions of fill fiber 13.

Since the weave sequence for preform 11 begins with fill fiber 13 passing over warp fiber x12, it is also required that the sequence ends by passing fill fiber 13 under x12 for positioning fill fiber 13 to restart the sequence. To provide for the proper position and capture fibers q6, s8, and u10, a specific end sequence is preferred. As the weave sequence is completed, fill fiber 13 makes a final rightward pass in layers 5 and 6, fill fiber 13 interlocking warp fibers 15 in layers 5 and 6 across upper surface 49 of base 17. Fiber portion 51 passes over fiber o5, then under p6 and over q6. This type of sequence continues downward along taper 22, with portion 51 passing over fibers s8 and u10, capturing these warp fibers 15 in the weave sequence. Portion 51 then passes under warp fiber v12, over w12, then under x12 to the starting position of the weave sequence.

Figure 4:
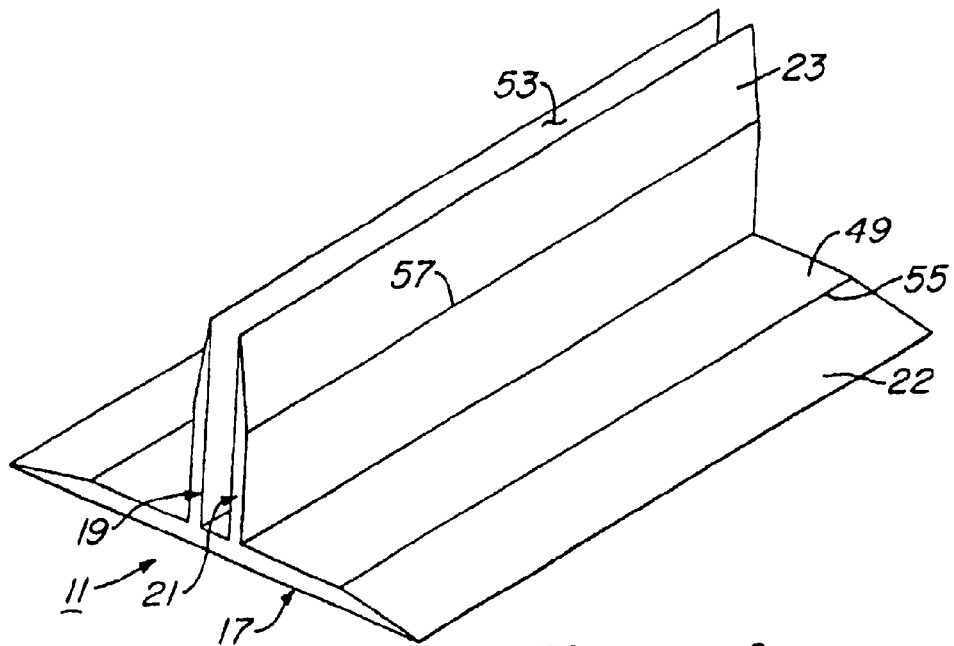
FIG. 4 is an isometric view of the preform of FIG. 1 with the legs in an upstanding position and showing the locations of tracer fibers in the preform according to the invention.

Completed, woven, pi-shaped preform 11 is shown in FIG. 4 with legs 19, 21 in the vertical position, forming a clevis 53 between legs 19, 21. Preform 11 is woven by repeating the complete weave sequence to form adjacent vertical sections along the longitudinal length of preform 11. The weave process produces continuous lengths of preform 11, which are then cut to the desired lengths for installation.

Figure 5:
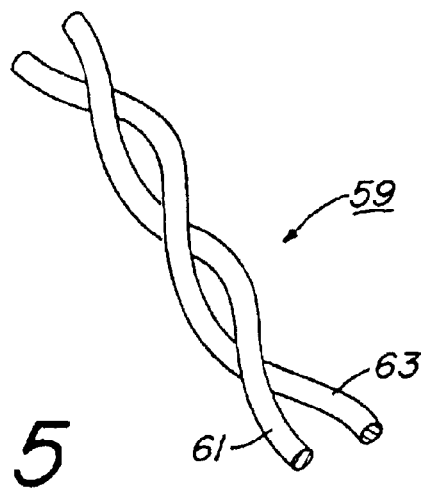
FIG. 5 is an enlarged perspective view showing the multiple strands of the tracer fibers of FIG. 4.

An additional feature of preform 11 is the replacement of warp fibers 15 at selected locations in preform 11 with tracer fibers 59, shown in FIG. 5. Useful locations include the inner boundary of tapers 22 on base 17 and tapers 23 on legs 19, 21, such as at locations 55 and 57 of tapers 22 and 23, respectively.

Referring to FIG. 5, tracer fiber 59 is formed by joining at least two strands of selected characteristics. The preferred embodiment of tracer fiber 59 is shown in the figure, with stainless steel strand 61 joined to an aramid or carbon strand 63, which is preferably formed of Kevlar® or a similar material. Stainless steel strand 61 is x-ray opaque, allowing for imaging of locations 55, 57 to determine the points at which tapers 22, 23 begin. This is especially useful when determining the perimeter of upper surface 49 to effect repairs on the installation of preform 11 after curing. Kevlar strand 63 has a color that preferably contrasts with the color of the surrounding fill fibers 13 and warp fibers 15 used to form preform 11, allowing a user to visually identify tracer fibers 59. This feature may be used to visually identify selected locations on preform 11 or to identify portions of preform 11. For example, tracer fibers 59 having different color Kevlar strands 63 may be located on different portions of preform 11, such as legs 19, 21 or base 17, to visually differentiate the portions or to identify right or left lateral sides. Optionally, tracer fibers 59 having may be placed only in location 55 on base 17, with a colored or otherwise visually distinguishable warp fiber 15 being used in location 57 in legs 19, 21. This facilitates the verification of correct orientation of an installed preform 11 during x-ray inspection after installation, with stainless steel strands 61 being present only in base 17.

Typically, preforms are woven using one type of fiber, for example, carbon (graphite) fibers, for both the warp and fill fibers. However, preforms may also be hybrid weave patterns that use fibers made form multiple materials, such as carbon and glass fibers. These patterns can result in preforms having higher toughness, reduced cost, and optimized thermal-expansion characteristics. The weave patterns comprise all warp fibers of one type and all fill fibers of another type, or the weave may have warp and/or fill fibers of alternating types arranged in a "checkerboard" pattern throughout the layers.

The advantages of the present invention include the ability to weave a high strength and easy-to-use preform for assembling components into structures. The improved weave interlocks the warp fibers of each layer and interlocks the layers to each other, while distributing loads through the preform in a highly symmetrical manner. By having an odd number of columns of warp fibers in the base between the legs of the preform, a weave pattern can be mirrored about a central plane of symmetry. Tracer fibers used as warp fibers at selected locations allow a user to identify locations on the preform or portions of the preform.

While the invention has been shown in only some of its forms, it is not thus limited but is susceptible to various changes and modifications without departing from the spirit thereof.

We claim:

1. A three-dimensional preform weave architecture, comprising:

a plurality of adjacent layers, each layer having a plurality of warp fibers, the warp fibers being generally parallel to each other and forming generally vertical columns;

a plurality of fill fibers woven among the layers of warp fibers to form a base and two legs extending from the base, the base and each leg being formed from at least two layers of warp fibers, the base having a first edge and a second edge, each leg having a inner end and an outer end; wherein each fill fiber has a beginning at the first edge of the base, then extends to the second edge of the base, then extends back toward a central section of the base, then exits the layers of the base and extends into the layers of one of the legs before extending into the layers of the other of the legs, then exits the layers of the legs and extends back into the layers of the base for returning to the first edge of the base, the fill fibers entering each leg at the inner end of each leg and extending to the outer end of each leg before returning to the inner end of each leg, the fill fibers interlocking the layers of the base and interlocking the layers of each leg, the fill fibers also interlocking the warp fibers within each layer; and the columns of warp fibers include central columns of warp fibers located between the fill fibers connecting one of the legs to the base and the fill fibers connecting the other of the legs to the base, the central columns comprising an odd number of columns and allowing for a substantially mirror-image weave pattern about a central plane of symmetry of the weave architecture.

2. The weave architecture of claim 1, wherein:

the columns of warp fibers include separator columns of warp fibers adjacent opposite lateral sides of the central columns, each separator column dividing portions of the fill fibers into two groups, one group extending between the base and the leg from between the central set of columns and the adjacent separator column, the other group extending from between the separator column and the columns laterally outward of the separator column.

3. The weave architecture of claim 1, wherein:

the base has at least four of the layers.

4. The weave architecture of claim 1, wherein:

the base has more of the layers than each of the legs.

5. The weave architecture of claim 1, wherein:

the layers are interlocked by running a portion of a fill-tow pattern over a warp fiber in a first layer in a first column and below a warp fiber in an adjacent, second layer in an adjacent, second column, the second layer being below the first layer.

6. The weave architecture of claim 1, wherein:

each fill fiber additionally extends from the first edge of the base to the second edge of the base and back to the first edge of the base without entering each leg.

7. The weave architecture of claim 1, wherein:

at least a portion of the warp fibers comprises multi-strand tracer fibers for identifying selected locations in the weave architecture, the tracer fibers being formed from at least one strand that is x-ray opaque and at least one strand that has a color contrasting the color of surrounding warp and fill fibers.

8. The weave architecture of claim 7, wherein:

the tracer fiber is formed from stainless steel and aramid strands.

9. The weave architecture of claim 7, wherein:

the edges of the base are tapered; and the tracer fibers are located in the base along the inner edge of each of the tapers.

10. The weave architecture of claim 1, wherein:

at least a portion of the warp fibers in the base has a smaller cross-sectional area than the warp fibers in the legs.

11. A woven preform, comprising:

a base having a central portion and two lateral edges;

at least two legs extending from one surface of the base; wherein the preform is woven with a three-dimensional weave pattern, the base and each leg being formed of at least two layers of warp fibers, the warp fibers being generally arranged in columns, at least one fill fiber being woven among the warp fibers for interlocking the warp fibers of the base to each other and interlocking the warp fibers of the legs to each other, the legs being connected to the base at intersections by portions of the fill fiber extending between each leg and the base, two groups of portions of fill fibers connecting each leg to the base;

an odd number of central columns of warp fibers in the base are located between the intersections of the legs and base, the odd number of columns allowing a substantially mirror-image weave pattern about a central plane of symmetry of the preform; and separator columns are located adjacent the central columns, one of the groups of portions for each leg intersecting the base adjacent one side of the corresponding separator column, the other of the groups for each leg intersecting the base on the opposite side of the corresponding separator column.

12. The preform of claim 11, wherein:

the layers of warp fibers comprise at least four layers in the base and in the legs.

13. The preform of claim 11, wherein:

the base has more layers of warp fibers than each of the legs.

14. The preform of claim 11, wherein:

at least a portion of the warp fibers comprises multi-strand tracer fibers for identifying selected locations in the preform, the tracer fibers being formed from at least one strand that is detectable by x-ray imaging and at least one strand that has a color contrasting the color of surrounding fibers.

15. The preform of claim 14, wherein:

the tracer fiber is formed from stainless steel and aramid strands.

16. The preform of claim 11, wherein:

at least a portion of the warp fibers in the base has a smaller cross-sectional area than the warp fibers in the legs.

17. A method of forming a woven preform, the method comprising (a) providing at least a pair of adjacent base layers of warp fibers for forming a base, the warp fibers being generally parallel to each other and generally arranged in columns;

(b) providing at least two layers of adjacent leg layers of warp fibers for forming a pair of legs, the warp fibers being generally parallel to each other and generally arranged in columns;

(c) weaving at least one fill fiber among the base layers and leg layers for interlocking the warp fibers of each base layer to each other and interlocking the warp fibers of the leg layers to each other, the legs being connected to the base at intersections by portions of the fill fiber extending between each leg and the base, two groups of fill fiber portions connecting each leg to the base;

(d) locating an odd number of central columns of warp fibers in the base between the intersections of the legs and base, the odd number of columns allowing a substantially mirror-image weave pattern about a central plane of symmetry of the preform; and (e) locating separator columns adjacent the central columns, one of the groups of fill fiber portions for each leg intersecting the base adjacent one side of the corresponding separator column, the other of the groups of fill fiber portions for each leg intersecting the base on the opposite side of the corresponding separator column.

18. The method of claim 17, wherein:

step (a) comprises providing at least one multi-strand tracer fiber within the preform for identifying a selected location on the preform.

* * * * *